Aug. 27, 1940.    C. W. ABBOTT    2,212,505
ELECTRICAL FIXTURE CONSTRUCTION
Filed Oct. 27, 1936    5 Sheets-Sheet 1

INVENTOR
CHARLES W. ABBOTT
BY William T. Kiesner
ATTORNEY

Aug. 27, 1940.  C. W. ABBOTT  2,212,505
ELECTRICAL FIXTURE CONSTRUCTION
Filed Oct. 27, 1936   5 Sheets-Sheet 2

INVENTOR
CHARLES W. ABBOTT.
BY William T. Kniesner
ATTORNEY

Aug. 27, 1940.    C. W. ABBOTT    2,212,505
ELECTRICAL FIXTURE CONSTRUCTION
Filed Oct. 27, 1936    5 Sheets-Sheet 4

INVENTOR
CHARLES W. ABBOTT
BY William T. Kriesner
ATTORNEY

Aug. 27, 1940.  C. W. ABBOTT  2,212,505
ELECTRICAL FIXTURE CONSTRUCTION
Filed Oct. 27, 1936  5 Sheets-Sheet 5

INVENTOR
CHARLES W. ABBOTT
BY William T. Kneemer
ATTORNEY

Patented Aug. 27, 1940

2,212,505

UNITED STATES PATENT OFFICE 2,212,505

ELECTRICAL FIXTURE CONSTRUCTION

Charles W. Abbott, Larchmont, N. Y.

Application October 27, 1936, Serial No. 107,874

18 Claims. (Cl. 173—338)

This invention relates to electrical fixture construction and more particularly to such fixtures as are employed in interior wiring systems.

This application is a continuation in part of my application Serial No. 25,830, filed June 10, 1935, entitled "Wiring systems," which matured into Patent No. 2,115,000, issued April 26, 1938.

One of the objects of this invention is to provide a simple, practical and inexpensive fixture construction and one that will be reliable in action and rugged and durable in construction. Another object is to provide an electrical fixture construction capable of rapid and inexpensive assembly and manufacture. Another object is to provide an electrical fixture construction which may be speedily, conveniently and with little labor installed mechanically and electrically either in course of initial installation of the wiring system itself or as an addition to an already existing wiring system.

Another object is to provide an electrical fixture construction capable of being mounted in or on a wall or the like and to which a multiple conductor construction, such as non-metallic sheathed cable, may be quickly and readily related electrically without incurring certain disadvantages, such as increase in conductor resistance, giving rise to contact resistances, and others. Another object is to provide an electrical fixture construction adapted to be mounted in or on a wall, or the like, and in which a dependable mechanical anchorage of the multiple conductor construction, particularly of the non-metallic sheathed type, may be readily achieved. Another object is to provide an electrical fixture construction for wiring systems of the above-mentioned type and in which the electrical connections to the multiple conductor construction of the system may be made without having to interrupt the conductors therein, particularly the so-called grounded or neutral conductor. Another object is to provide an electrical fixture construction in which electrical connections to the conductors of the wiring system may be made in a simple and dependable manner, with no injury to the conductors themselves, and without giving rise to undesirable and possibly dangerous electrical potentials or conditions in the circuit or system. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawings in which are shown by way of illustration several of the various possible embodiments of my invention.

Similar reference characters refer to similar parts throughout the several views in the drawings.

Figure 1:
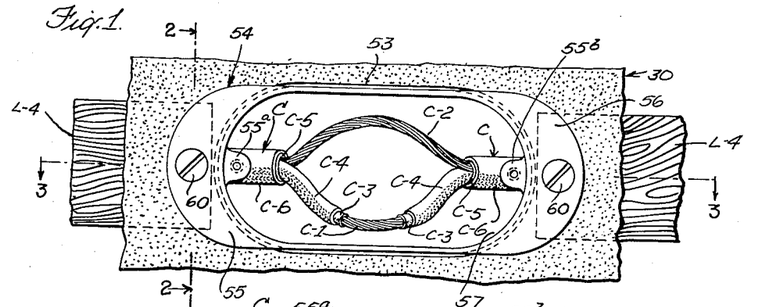
Figure 1 is a front elevation of a mounting plate related to a wall construction, showing also a possible form of multiple conductor construction.
Figure 2:
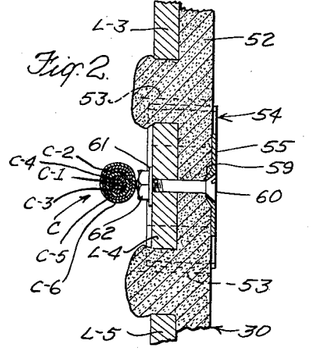
Figure 2 is a vertical sectional view, as seen along the line 2—2 of Figure 1.

As conducive to a clearer understanding of certain features of my invention let it be assumed that a multiple insulated conductor construction C extends in a run behind the wall surfacing 30 of Figures 1 and 2, the wall portion 30 being of any suitable construction and illustratively of plaster 52 and lathing, such as wooden laths L—3, L—4, L—5. The conductor construction C may be supported in any suitable way, for example, as shown in my above-mentioned co-pending application.

In so far as certain features of my invention are concerned, the conductor construction employed preferably takes the form of an outside casing-like covering C—6 (Figures 1 and 2), preferably braided of thread or cord and treated or impregnated with any suitable material for water- and fire-proofing it, and within the covering C—6 are contained two conductors C—1 and C—2 insulated from each other. It is to these two conductors that the electrical fixture is to become electrically associated.

The conductors C—1 and C—2 may be insulated from each other in any suitable way and illustratively and preferably conductor C—1, preferably stranded, takes the form of a core conductor covered by an insulating compound C—3, preferably of rubber, and about that is a covering C—4 preferably made of strands, generally circular in cross-section, of insulating fibrous material, such as paper, that extend helically about the covering C—3 and have interwoven therewith strands of suitable material which may be cotton.

Covering C—4 then has helically wound about it the stranded conductor C—2 whose strands, however, lie closely side by side (see Figure 2) and thus form a relatively thin and flat band-like conductor tightly wrapped about the exterior of the covering C—4 in a helix of relatively great pitch. Conductor C—2, in the wiring system, is the grounded or neutral conductor. About it and the parts which it electrically envelops is wrapped a covering C—5 made of a band or tape-like insulating material preferably in the form of laminated paper band or substantial thickness and of appropriate width and at a pitch equal to the width of the band itself, successive turns of the helix being thus in snug edge to edge contact with each other. And it is about the wrapping or covering C—5 that the outer casing-like covering C—6 is braided or woven. For fuller details of the construction and directions of winding, and the like, reference may be made to my above-mentioned co-pending application.

In the wall 30 there is then made a hole 53 (Figure 1) preferably by boring one or more holes and using a saw, thus giving the hole 53 substantial dimensions, being, for example, about 3" or 4" in horizontal dimension and 1¾" in vertical dimension. Hole 53 preferably intersects one or more laths, illustratively lath L—4, and it runs lengthwise of the run of conductor C.

Into the hole 53 there is now inserted a mounting plate generally indicated (Figures 1 and 2) at 54. This mounting plate 54 is preferably of sheet metal, has two plate-like ears 55 and 56 extending in a common plane, and has an opening 57 shaped substantially as shown in Figure 1, and extending rearwardly of the plane of the ears 55—56 (to the left as viewed in Figure 2) is a flange 58 which enters the hole 53, is substantially snugly received therein, and provides a strong metal lining, as it were, for the hole 53. The depth of the flange 58 is preferably slightly more than the average thickness of the particular kind of wall surfacing to which the construction is to be applied, in the illustrative instance, lathing and plaster.

The ears 55 and 56 are provided with countersunk holes 59 (Figure 2) through which suitable securing means are passed into the wall construction itself, thereby to hold the mounting plate 54 in place. Preferably the securing means comprise bolts 60 and preferably also the hole 53 is so cut that the securing means 60 can pass into or through a lath, such as the lath L—4, which is interrupted by the cutting of the hole 53. The opening 57 in the mounting plate 54, dimensioned as above indicated, is large enough to permit the positioning of a washer 61 and the nut 62 (Figure 2) to the rear of the wall portion after, of course, drilling appropriate holes, so that the bolt 60 may be easily threaded into the nut 62, as by a screw driver operated from the outside of the wall. Thereby a strong and secure interrelation of the mounting plate 54 and the wall construction itself is easily and quickly achieved and, rather than weakening the wall, as is common in prior practice with respect to heretofore known wall fixtures, this preferred construction, whereby bolts may be employed, achieves a substantial strengthening of the portion of the wall where the fixture, such as an outlet receptacle, is to be mounted.

Having thus mounted the mounting plate 54, the conductor construction C now immediately to the rear of the mounting plate 54, is drawn into the substantial open space provided by the opening 57 in the mounting plate 54; the conductor construction need not be pulled entirely through the opening 57 for, due to the construction of the conductor itself and the substantial dimensions of the hole 57, the next steps may be easily and conveniently pursued.

With the conductor C thus positioned (Figure 3), a short section of the outer covering C—6 is removed, say of a length of about 2½". Thereby the wrapped covering C—5 is exposed but the strand of which it is formed is cut adjacent the two ends of the outer covering C—6; once cut at one or both ends, the wrapped covering C—5 is easily and quickly unwrapped and hence removed. Thereby outer conductor C—2 becomes exposed as it lies snugly against and about the covering C—4.

To remove the conductor C—2 from its snug position against and about the covering C—4 and to do so without mechanical or other injury to it, the operator twists the right-hand portion of the conductor C and hence that portion that is in the right-hand end of the opening 57, but this twisting is in the direction of the arrow K (Figure 3) which is in the direction in which the various component helical parts are wound. Preferably at the same time and conveniently by using the other free hand, the operator twists the left-hand part of the conductor C and hence that part that projects into the left-hand part of the opening 57 but that is twisted in the direction of the arrow Y and hence in a direction opposite from the direction of twist given the right-hand portion of the conductor construction.

In each instance it will be noted that the direction of twist is in a direction to tighten up the turns of the helixes of the various helically wound parts, such as the band of covering C—5, the conductor C—2, the fiber or paper strands of the covering C—4 in those parts of the conductor construction C respectively to the left and right (Figure 3) of the opening 57 of the mounting plate 54, thereby avoiding any possible injury or detrimental disturbance of these parts, and particularly avoiding such possible disruption, breakage, or the like, as might result if the twists were in a direction to unwind or untwist these various helically wound parts.

Furthermore, the respective directions of twisting are immediately indicated to the operator once the helical conductor C—2 is bared or exposed, for the two directions of twist are such that, with respect to the bared portion of conductor C—2 and the parts underlying it (see Figure 3), unwinding of the bared portion of conductor C—2 from both of its ends and with respect to the parts (C—4, C—3 and C—1) underlying it, must proceed. Any attempt to twist in other directions would be effective to wind conductor C—2 more tightly about its underlying parts.

Accordingly, a dependable and foolproof baring of conductor C—2, without mechanical injury thereto and without requiring the application to it of any tools, is insured, and at the same time covering C—4 of the core conductor C—1 is automatically exposed. That covering is now removed but preferably throughout a somewhat lesser interval of length than the interval of length of the exposed conductor C—2. The rubber compound covering C—3 is thereby exposed and that, of course, is easily removed, again preferably throughout a slightly shorter length than the section of covering C—4 that is removed, and thus the core conductor C—1 stands exposed.

Figure 4:
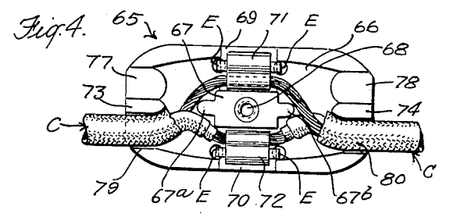
Figure 4 is a plan view of a contact or connector block.
Figure 5:
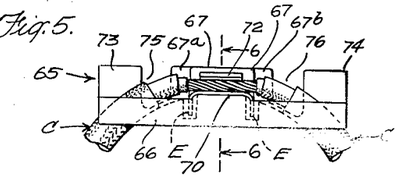
Figure 5 is a side elevation, as seen from the lower side of Figure 4.
Figure 6:
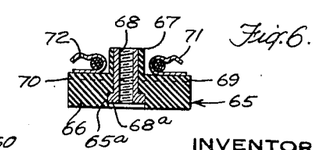
Figure 6 is a vertical sectional view of the contact block along line 6—6 of Figure 5.

The two exposed portions of the conductors C—1 and C—2 are now ready to be related to the fixture which is ultimately to be related to the opening 53 in the wall, and preferably this fixture embodies a contact block generally indicated at 65 in Figures 4, 5 and 6, to which reference may now be made. The contact block proper is preferably made of any suitable solid dielectric material, and preferably of a moldable material like "Bakelite", and it embodies also features of construction which facilitate its molding. It has a base portion 66 which in outline, as viewed in Figure 4, follows the outline of the hole 57 in the mounting plate 54 (Figure 1) above described, though being smaller in dimensions. Upstanding from the base portion 66 and centrally positioned therein is a pillar 67 of substantial dimensions and molded into it or otherwise dependably secured therein is a threaded bushing 68 which, as is better shown in Figure 5, is preferably provided with a head 68ª of preferably substantial expanse in order thereby to overlap laterally portions of the material at the under side of the block 65, these portions being preferably formed by a countersunk hole 65ª (Figure 5) whereby also the head 68ª is accommodated interiorly of the plane of the bottom face of the base portion 66.

To each side of the pillar 67 the contact block 65 is shaped to provide flat or plane platforms, as at 69 and 70 (Figures 4, 5 and 6) between which, as is better shown in Figure 6, the pillar 67 forms a barrier.

The platforms 69 and 70 form supports of substantial area against which rest the bottom wings of sheet metal contact clips 71 and 72, respectively, these contact clips being made of a suitable sheet metal like brass, bronze, or the like, preferably having some resiliency or spring action, and in cross-section or end view, as seen in Figure 6, they are somewhat U-shaped, one arm of which forms the bottom wing and the other arm of which forms the upper wing, with the junctions between the two arms facing toward or resting against the pillar 67.

The contact clips 71, 72 are held in place or secured to the contact block 65 in any suitable way and they may have portions thereof, such as the depending ears E, molded into or otherwise secured to the base portion 67 or to the material forming the platforms 69 and 70.

Preferably, also, the upper wings of the contact clips 71 and 72 are bent or ribbed, as is better shown in Figure 6, to define under each upper wing two zones or regions each for the reception of a single conductor thereinunder.

As is better seen in Figure 4, the pillar 67 has extensions 67ª and 67ᵇ, each directed toward an end of the contact block 65, thereby forming longitudinal extensions of the barrier formed by the pillar 67 itself and thereby insuring, as will later better be seen, the maintenance of a better separation of the conductors and their parts respectively associated with the two contact clips 71, 72.

At the respective ends of the base portion 66 (Figures 4 and 5) and in substantial alinement with the barrier portions 67ª, 67ᵇ of the central pillar 67, the base portion 66 has upstanding therefrom and integrally formed therewith barriers 73 and 74; these barriers are preferably the same height as the pillar 67 (see Figure 5) and though they preferably extend to the respective end edges of the base portion 66, it will be noted, as is better shown in Figures 4 and 5, that they are at their inner ends spaced from the ends of the barrier extensions 67ª, 67ᵇ, respectively, thereby to form gaps 75 and 76.

On two sides of the upstanding barrier 73, the base portion 66 is thinned out (Figures 4 and 5) to form relatively thin-walled portions 77 and 79 and similar thin-walled portions 78 and 80 are provided one on each side of the other upstanding barrier 74; these thin-walled portions are of sufficient thickness with respect to the material of which the contact block 65 is made that they or any one of them may be easily broken out. And from the inner ends of these thin-walled portions 77, 78, 79, 80, the base portion 66, excepting the longitudinal side or marginal portions thereof, gradually increase in thickness (see Figure 5) to a thickness approaching the vertical dimension or height of the platforms 69 and 70 that support the contact clips.

Figure 3:
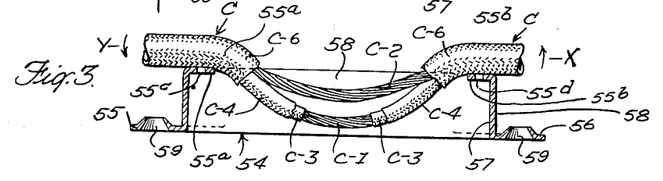
Figure 3 is a horizontal sectional view along the line 3—3 of Figure 1 and showing the relation of the conductor construction to the mounting plate after completing certain steps of installation.

The above described contact block is now to be related to the conductor construction and mounting plate 54 which parts are thus far, as above described, brought into the condition and interrelation better shown in Figure 3, and this is brought about first by breaking out two opposed thin-walled portions of the contact block 65, illustratively, referring now to Figure 4, by breaking out the portions 79 and 70. The resultant recesses in the respective ends of the contact block 65 are thus made ready to accommodate the respective sides of the loop of the conductor construction as that loop is shown in Figure 3, and accordingly the contact block 65 is so brought in under the conductor loop, the latter being pulled out of the opening 57 (Figure 3) sufficiently, if necessary, to facilitate so interrelating the contact block to the conductor; at the same time, the two bared portions of the conductors C—1 and C—2 (Figure 3) are passed respectively under the upper wings of the contact clips 71 and 72, one conductor passing to one side of the pillar 67 and the other conductor passing to the other side of the barrier pillar 67. By twisting the conductor construction at each side of the interval throughout which the conductors thereof have been bared in appropriate directions to tend to wind the outer conductor C—2 (Figure 3) back onto the exposed length of the covering C—4, the loop which is formed by the bared portions of the conductors C—1 and C—2 and within which are now encompassed the inner ends of the contact clips (Figure 6) and the barrier pedestal 67, is tightened up, thereby virtually returning all parts of the conductor construction back to their normal mechanical interrelation, and there results a substantially tight or secure gripping or binding of the contact block 65, or rather the parts thereof encompassed by this little loop, by the loop which is thereby tightened up. During this action the barrier extensions 67a and 67b (Figures 4 and 5) insure that mechanical and electrical separation between the two sides of the circuit represented by the conductors C—1 and C—2 is maintained.

The resultant mechanical interrelation is very strong and secure and, when the contact block 65 becomes anchored in a manner later described, the run of conductor is thereby dependably anchored against being pulled in either direction, as viewed in Figure 1, and a reason for this dependable anchorage will later be made apparent in detail. Also, the tightening up of the little loop of bare conductor, as above described, insures also a dependable and durable electrical and mechanical interrelation with the hook-shaped contact clips (see Figure 6), thereby not only making good electrical contacts but also negativing any possibility of the removal of either conductor from its hook-shaped clip, for thereby the slack necessary in achieving an "unhooking" is definitely taken up. If desired, depending upon circumstances, one or both of the remaining thin-walled portions, in the assumed distance portions 77 and 78, may be broken out to accommodate at one or both ends, as the case may be, the beginnings or the ends of one or more additional runs of conductor construction like the construction C, the contact clips being of sufficient expanse to accommodate therein the additional bared conductors. Thereby the existing run of two-conductor construction may be "tapped" or extended, as conditions or requirements might dictate.

Contact block 65 (see Figure 7) is of smaller dimension than the opening 57 in the mounting plate 54 and will be seen to expose outwardly of the latter the two upper wings of the contact clips 71 and 72 and also the open end of the threaded bushing 68, these parts being thus and thereby positioned for coaction with the electrical fixture, in the illustrative instance an outlet receptacle. An illustrative and preferred construction of this fixture, where it takes the form of an outlet receptacle, is shown in Figures 8–11, to which reference should now be made. The fixture, generally indicated by the reference character 85, and which preferably forms a counterpart to the above-described contact block 65, comprises a main supporting portion or plate-like member 86, hereinafter termed simply the "supporting plate," from which depends a main body portion 87, preferably hollow or casing-like, which in outline (see the bottom view of Figure 11) substantially matches the outline of the opening 57 (Figure 1) in the mounting plate 54 but is sufficiently smaller than the latter to be snugly received therein.

In this connection, however, it is to be noted that the flange 57 (Figures 1 and 3) has two ears 55a and 55b provided with threaded holes 55c and 55d, respectively; they are in a plane spaced rearwardly from the main supporting ears 55 and 56. The depending main body portion 87 (Figures 9 and 11) of the fixture part 85 is grooved at its two opposite ends to accommodate therein these auxiliary ears 55a and 55b and subsequently to receive and accommodate securing screws, as is later described.

Parts 86 and 87 may be made in one piece and are preferably made of a suitable solid dielectric material, preferably a moldable material like "Bakelite," and the supporting plate 86 thereof is of sufficient expanse (Figure 8) to completely cover over the portions of the mounting plate 54 (Figures 1 and 2) that are exposed on the front face of the wall 30. If desired, the general contour or shape of supporting plate 85 and of the member 54, as it is seen in Figure 1, are similar and preferably also the supporting plate 86 is peripherally flanged as at 86a (Figures 9, 10 and 11) so that ultimately the flange 86a, within which the exposed parts of the mounting plate 54 are receivable, well overlaps the latter and can engage the finished wall surface of wall 30. Also, the outer surfaces of the supporting plate 86 (see Figure 8) may be contoured, colored, or shaped in any desired decorative or attractive fashion.

The bottom end of the main body portion 87 of the fixture 85 (Figures 9, 10 and 11) is cored out as at 88 in a shape and dimensions such that the contact block 65 (Figures 4 and 7) is readily slid into it, the walls of the recess or cored out portion 88 in effect telescoping ultimately over or about the peripheral walls of the contact block 65, the latter thus closing the hollow part 87.

Figure 10:
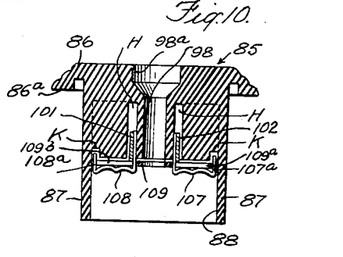
Figure 10 is a sectional view on line 10—10 of Figure 9.
Figure 11:
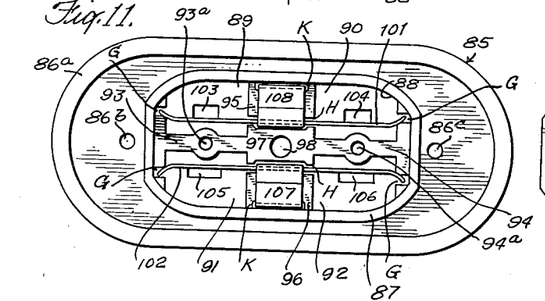
Figure 11 is a bottom plan view thereof.

The cored out recess 88 (Figures 9 and 10) which is of a depth commensurate with the maximum depth or height of the contact block 65, as it is viewed in Figures 5 and 6, has four chamber-like recesses 89, 90, 91 and 92 formed as upward extensions thereof, these chambers being shaped substantially as is better shown in Figure 11, from which it will be seen that the separating walls thereof form two alined longitudinally extending barriers 93 and 94, these being relatively thin or rib-like, and two cross-wise-extending portions 95 and 96 of substantial width, forming platforms of areas commensurate with those of the platforms 69 and 70 of the contact block 65 (Figures 4, 5 and 6) and adapted, when the above described telescopic arrangement is brought about, to become juxtaposed to each other respectively; between the platform portions 95 and 96 (Figure 11) and integrally connected therewith as well as with the rib-like partitions 93 and 94, is what I shall term a pillar 97 of which the chamber-dividing walls are extensions. Pillar 97 is adapted to become juxtaposed to the pillar 67 and extending centrally therethrough and upwardly through the supporting plate 86 (see Figure 9) is a hole 98 which when the above described telescoped relation is brought about, becomes alined with the threaded hole in the bushing 68 of the contact block 65; in the face of the supporting plate 87 (Figure 9) this hole 98 is countersunk as at 98a and it is adapted to receive a relatively large or heavy screw 99 ultimately to become threaded into the bushing 68.

The left-hand end walls of the chambers 89 and 91 (Figure 11) and the right-hand end walls of the chambers 90 and 92 are notched as at G to receive the slightly bowed ends of metal strips 101 and 102, one on each side of the alined barriers 93, 94, the cross-barrier 95—96—97 being slotted or recessed as at H to accommodate the spring metal strips 101—102. The recesses G and H are of a depth, as viewed in Figure 11, equal to the width of the metal strips 101—102 so that when the latter bottom therein, their outermost edges (the edges seen in Figure 11) lie in the plane of the outer faces of the dividing walls or barriers 93, 95, 94, 96 and 97.

Thereby contact strip 101, preferably made of a spring metal like bronze or brass, has portions thereof, each adapted to bow yieldingly, positioned in the chambers 89 and 90 and portions of the contact strip 102 are likewise positioned in the chambers 91 and 92. Extending through the supporting plate 86 (Figures 8 and 11) and thus into the chambers 89, 90, 91 and 92, are holes 103, 104, 105 and 106, respectively, these holes being of rectangular cross-section and forming two pairs, namely, 105—103 and 106—104; the holes of each pair are spaced apart by the usual or standard distance at which the contact prongs of standard attachment plugs or plug caps are spaced and thus access to and contact with the spring contact strips 101 and 102 may be achieved by the insertion of such connecting plugs through the supporting plate 86. If desired, and as is better indicated in Figure 9, the contact strips 101—102 are provided with upwardly directed extensions or brushes in general alinement with the respective holes in the supporting plate 86, in order to improve the detachable electrical interconnections that may be made as above described.

The contact strips 101 and 102 (Figures 11 and 10) have integrally formed therewith or secured thereto sheet metal and laterally directed extensions 107 and 108, respectively overlying the platforms 95 and 96 and of dimensions or areas commensurate with those of the latter (Figure 11). These extensions 107, 108 may be in general U-shaped, as is better shown in Figure 10, one arm thereof being formed by a contact strip or having a contact strip secured thereto and accommodated in the slots H, and the other arms thereof 107a and 108a, respectively entering recesses K formed in the outer ends of the platform portions 95 and 96, respectively.

The members 107, 108 which, as will later appear, form contact members, are thus rigidly supported against material deformation particularly by forces imposed thereon in an upward direction, as viewed in Figure 10, for a purpose later described, and the members 107, 108, though they may be flat or otherwise shaped, are preferably contoured or curved as is better shown in Figure 10, it being noted that they project downwardly to a greater extent at their outermost ends than they do at their inner ends.

Figure 12:
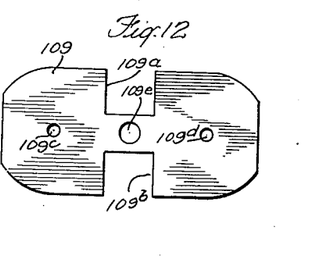
Figure 12 is a plan view of an insulating separator.

The contact strips and hence members 107 and 108 are held in assembled relation interiorly of the main body portion 87 preferably by means of a plate-like member 109 made preferably of a suitable solid dielectric material, such as fiber, and shaped substantially as is better shown in Figure 12. It need not be of great thickness and its shape is such that it may be readily stamped or punched; it is dimensioned and shaped to be snugly received into the cored out recess 88 and to bottom as it were against the exposed faces of the barriers 93, 94, and the pillar 97, being cut out as at 109a and 109b (Figure 12) to expose therethrough the contact members 107 and 108, while leaving marginal portions adjacent the cutouts 109a and 109b to rest against those portions of the platforms 95 and 96 that extend to each side of the contact members 107 and 108.

Thereby, the chambers 89, 90, 91 and 92 (Figure 11) become closed by the insulating member 109 and only the contact members 107 and 108 are now exposed to the cored out recess 88 in the main body portion 87. The closure member 109 is secured in place as by eyelets, rivets, screws, or the like, which are passed through holes 109c and 109d (Figure 12) in member 109 and enter holes 93a and 94a in the barriers 93 and 94, respectively.

Also, member 109 is provided with a central hole 109e which is in alinement with the central hole 98 in the pillar 97 of the fixture 85.

Figure 7:
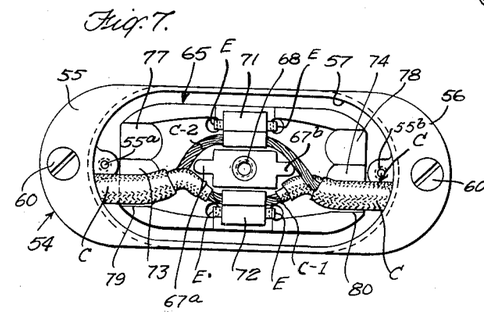
Figure 7 is a view like Figure 1 but showing also the connector block in temporary position.

The fixture 85 is now assembled first with respect to the contact block 65 as the latter is positioned as shown in Figure 7 and as above described, and then to the mounting plate 54. These steps are simple and easy to carry out. With the screw 99 entered into the central hole 98 of the fixture 85, the latter is now slid, as it were, into the opening 57 (Figure 7) in the mounting plate 54, contact block 65 being thereby entered or telescoped into the cored out recess 88 (Figure 9) of the main body portion 87 which, of course, enters the hole 57 of the mounting plate 54 first.

Thereby hole 98 (Figure 9) with the screw 99 therein becomes substantially alined with the threaded hole in the bushing 68 (Figures 4 and 7) of the contact block 65 so that, by rotating the screw 99 with the aid of a screw driver, the screw 99 enters the threaded bushing 68 and draws the contact block 65 inwardly into the recess 88 with which it makes a somewhat loose fit. But as contact block 65 is telescoped or entered into the recess 88, the contacts 107 and 108 exposed to or projecting into the recess 88 (Figures 10 and 11) become juxtaposed respectively to the contact clips 71 and 72 (Figures 4 and 6 and 7) of the contact block 65, each of these four contacts being backed up, as above described, by the platform-like portions of the respective parts to which they are secured. As the screw 99 proceeds to draw the contact block 65 into the recess 88, therefore, relatively rigid contact 107 (Figure 10) engages the upper wing of contact clip 71 (Figures 4 and 6) of the contact block 65 and relatively rigid contact member 108 makes similar engagement with the upper wing of the contact clip 72.

The screw 99 is securely tightened up, causing the upper wings of the spring clips 71 and 72 (Figure 6) to be bent downwardly and inwardly and toward their respective opposed bottom wings, an action that is dependably made to take place by reason of the above described shapes of the contact members 107, 108 and of these upper wings, the former (see Figure 10) in effect camming the outer free ends of the upper wings of the contact clips 71, 72 downwardly and inwardly and thereby insuring against escape of the conductor or conductors from the clips for thereby the otherwise hook-shaped parts of the contact clips become closed. To a sufficient extent, also, these contact clips 71 and 72 are compressed in order thereby to securely clamp the conductors C—1 and C—2 therein, it being noted that the clamping action takes place closely adjacent the screw 99 and thus free from long leverage and hence a very substantial and dependable clamping pressure can be brought to bear. This same clamping pressure, it is to be noted, is, however, exerted through the contact members 107 and 108 so that electrical interconnections between the latter and their respective contact clips 71 and 72 and hence, also, with the conductors C—1 and C—2, respectively, is dependably secured and maintained. At the same time, the parts 65 and 85 are held in secure assembled relation. These mechanical and electrical interrelations are shown in the sectional view of Figure 13.

But in achieving such assembly, the insulating member 109 (Figures 9 and 12) becomes interposed between the contact strips 101, 102, on the one side, and the parts of the conductor construction C (see Figure 7) that are otherwise exposed outwardly of the contact block 65, and thereby a dependable insulating barrier is provided and maintained therebetween.

Figure 13:
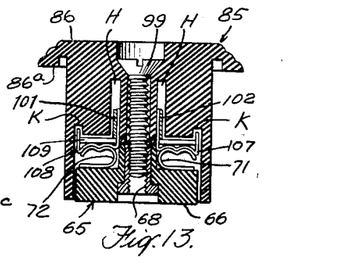
Figure 13 is a transverse sectional view through the assembled outlet receptacle and contact block.
Figure 14:
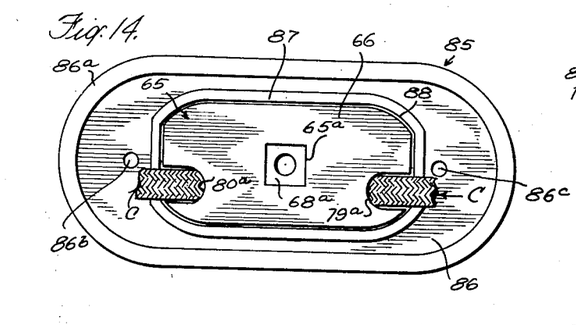
Figure 14 is a rear view of the complete assembled construction.

By the time the clamping screw 99 has been sufficiently tightened up to achieve the above relation of the parts, contact block 65, as appears from Figure 13, is substantially entirely drawn into the bottom recess 88 of the fixture 85, the walls of the recess peripherally enveloping the contact block 65 whose base portion 66 thus forms a substantially complete closure at the outer end of the recess 88 itself, as is better shown in Figure 14, which is a rear view of these assembled parts; but the conductor construction C finds its entrance and egress through the recesses 79$^a$ and 80$^a$ (Figure 14) formed by breaking out the thin-walled portions 79 and 80, respectively, as earlier above described, in the base portion 66 of the contact block 65 when the latter was first related to the conductor construction C.

Now the supporting plate portion 86 (Figures 8 and 9) is provided with countersunk holes 86$^b$ and 86$^c$ spaced the same as the holes 55$^c$ and 55$^d$ in the securing ears 55$^a$ and 55$^b$. Bearing in mind that the supporting plate portion 86 is of an expanse and shape to cover and overlap the exposed portions of the mounting plate 54 (Figure 1) and that the main body portion 87 of the fixture 85 (Figure 9) somewhat and preferably loosely matches the opening 57 (Figure 1) in the mounting plate 54, the above described operations of assembly of fixture 85 to the contact block 65 brings the main body portion 87 into the opening 57 and brings the supporting plate 86 into a position to overlap and cover the exposed portions of the mounting plate 54, holes 86$^b$ and 86$^c$ of the supporting plate 86 becoming alined respectively with the threaded holes 55$^c$ and 56$^d$ in the ears of the mounting plate 54 and now two screws 111 and 112 (Figure 15) are passed through the former holes and threaded into the latter, thereby bringing the supporting plate 86 flush against the wall surfacing and securely uniting the fixture 85 and its related parts to the mounting plate 54 which, as above noted, is itself securely mounted in the wall. At the same time, due to features above described, the conductor construction C becomes dependably anchored so that it can dependably resist any stresses tending to pull it or the run of conductor away from the outlet fixture.

In this connection, it should be recalled how the small loop made of the bared portions of the conductors C—1 and C—2 (see Figure 7) encompasses and is anchored by the pillar 67, an action that is aided by the secure clamping of the conductors themselves between the metallic parts interposed respectively between the platform portions 95 and 69, and 96 and 70.

Figure 8:
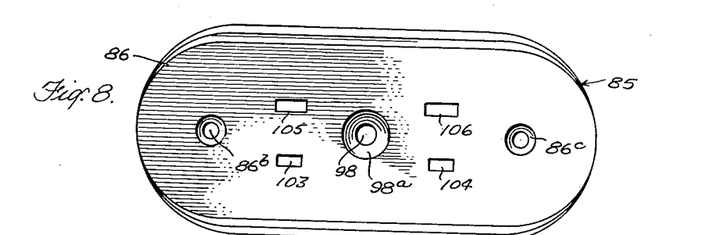
Figure 8 is a plan view of an outlet plug receptacle.
Figure 9:
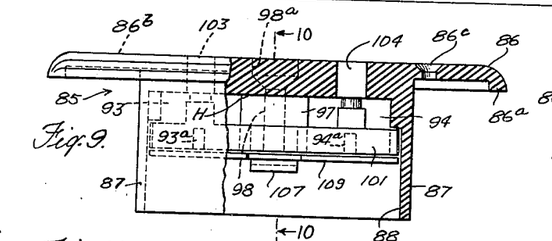
Figure 9 is a side elevation thereof partly in section.

Now, it is to be noted that, if preferred, and in such instances where polarity distinctions have to be carried out, the holes 105—103 and 106—104 (Figure 8) in the receptacle for receiving the prongs of the connecting plugs may be given distinguishing shapes, as suggested in Figure 8, so that, with correspondingly shaped prongs on the plugs, the connection to the circuit can be made only in one polarity sense. Now, with the conductor construction C, as above described, these polarity distinctions are easily carried throughout the entire wiring system, for the conductors C—1 and C—2 are of themselves, due to the mechanical interrelation thereof to each other and other parts of the conductor construction C, quite distinctive. For example, the core conductor C—1 may be made the positive side of the circuit and the helical conductor C—2 that is concentric therewith can be made the negative side of the circuit, and at no time is there any difficulty in distinguishing between the two or in making connections thereto in proper polar relations.

Figure 15:
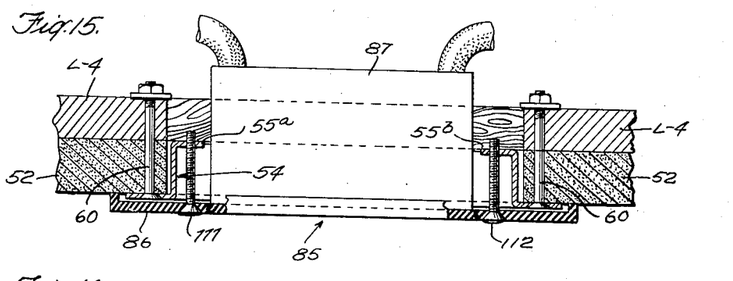
Fig. 15 is a plan view partly in section showing a completed installation with respect to an existing wall construction.

The above described construction of the mounting device 54 thus lends itself to installation with respect to an already existing wall structure but its features of construction are such that it may also be installed in the course of the construction of the wall surfacing or structure itself; Figure 15 illustrates the former type of installation and Figure 16 the latter.

Figure 16:
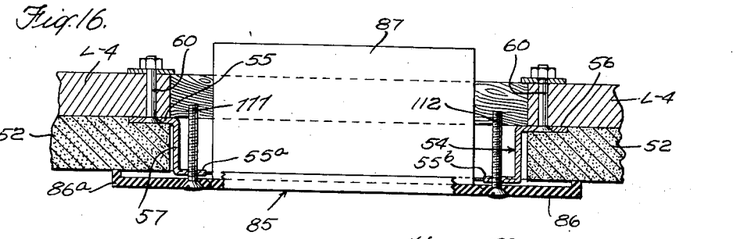
Fig. 16 is a similar view showing certain rearrangement of parts whereby the installation may be made in course of wall construction itself.

Thus, turning to Figure 16, the mounting device 54 is shown in reversed relationship with the ears 55 and 56 resting against the lathing L—4, L—4, secured thereto as by the bolts 60, as above described. The flange portion 57 extends forwardly rather than rearwardly, as in Figure 15, thus bringing the securing ears 55$^a$ and 55$^b$ in a plane to the front of the plane of the lath, the parts being so dimensioned that the spacing between these planes is on the order of the thickness of the wall surfacing, such as the plaster 52, which is subsequently to be applied.

Accordingly, with the device 54 mounted to the laths or other suitable support, the plaster 52 may be applied to the lathing, it being noted that the flange part 57 may thus act as a mold or form, outlining the ultimate opening in the wall, and against which the plaster 52 may abut. The securing ears 55$^a$, 55$^b$ thus extend in a plane approximating coincidence with the plane of the face of the plaster 52.

The above-described two-part fixture may then be related to the conductor structure of the cable C, all as above described and all with respect to the mounting device 54, the fixture construction being secured to the mounting member 54 by the screws 111, 112 passed through the holes 86$^b$ and 86$^c$ of the supporting plate portion 86 and threaded into the threaded holes of the ears 55ª and 55ᵇ, the flanged plate portion 86 becoming neatly and snugly alined against the face of the wall surfacing 52.

Figures 17, 18, 19, 20:
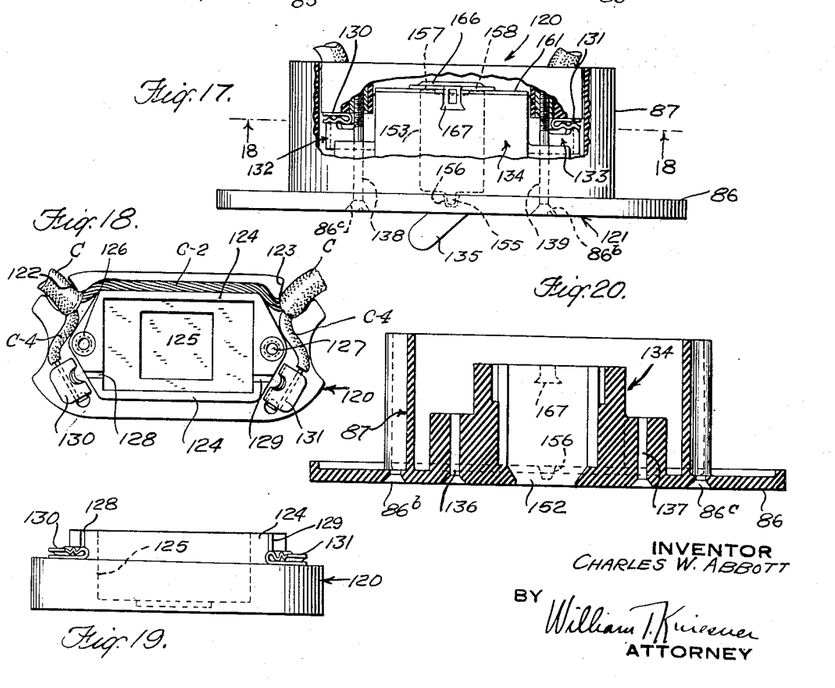
Figure 17 is a view like that of Figure 15, certain parts being broken away, showing a fixture construction embodied in the form of an electric switch.
Figure 18 is a detached plan view of a connector block of the switch fixture construction of Figure 17.
Figure 19 is a front elevation of the connector block of Figure 18.
Figure 20 is a central vertical sectional view of a casing part of the fixture of Figure 17.

The above is illustrative of how certain features of my invention are carried out where the electrical fixture is an outlet receptacle and in Figure 17 and certain subsequent figures I have shown how my invention is carried out where the electrical fixture takes the form of a switch. In Figure 17 the fixture is again of two parts, a contact block 120 closing and telescopically received within the open end of the hollow casing part 87 of the other fixture part 121, the latter being in many respects similar to the fixture part 85 above described. In this latter connection it has a front plate 86 with holes 86ᵇ and 86ᶜ to take screws 111 and 112 to be related to a mounting device 54 in the alternative manners illustrated above in Figures 15 and 16.

The contact block 120 is shaped as shown in Figures 18 and 19 being cut out as at 122 and 123 to permit entry therethrough of the cable C; there is an upstanding wall 124 encompassing therein a well 125 that is generally rectangular and in the two thinned end portions of the wall 124 are nuts 126 and 127 suitably anchored as by being set into the material of the block 120 while the material is still in a plastic state.

The wall 124 is provided with two slits 128, 129 positioned as shown in Figure 18, and at the outer termini of these slots the contact block 120 carries hook-shaped contact members 130 and 131, respectively, the latter being comparable in construction and mounting to the mountings 71, 72 of Figure 17.

As shown in Figure 18, the cable or conductor C is opened up as was explained above in connection with Figures 1 and 3, conductor C—1 is bared and cut, the two ends being brought under the respective hook-shaped contacts 130 and 131, while the other conductor C—2 rests snugly in the angle between the contact block 120 and the upper portion of the upstanding wall 124 thereof.

With the conductors so related to the contact block 120, and with respect to the mounting member 54, as was above described in connection with Figures 4–7, the fixture counterpart 121 is now applied and the hollow part 87 thereof telescoped over the contact block 120 and into the relationship shown in Figure 17, thereby bringing into juxtaposition to the contacts 130 and 131 two rigid conducting elements 132 and 133, respectively, the latter projecting, as is later described, from a central housing 134 of the fixture 121 and being electrically connected to the active switch members which may take any suitable form and may be actuated in any appropriate manner as, for example, by the pivoted and oscillatable finger piece 135.

This telescopic assembly also brings into juxtaposition to the nuts 126 and 127 (Figure 18) two holes 136, 137 (see Figure 20) in the fixture part 121, and thus screws 138, 139 may be inserted in these holes and threaded into the nuts, thereby drawing the two fixture parts 120 and 121 toward each other and causing the rigid conducting elements 132, 133 (Figure 17) not only to make good and dependable contact with the hook-shaped contacts 130, 131, but also to cause the latter tightly to clamp the ends of conductor C—1 therein.

The conducting elements 132, 133 may be for the above purposes mounted in any suitable manner within the casing part 121 and an illustrative relationship therebetween and with respect to a switch construction may now be set forth.

Figure 21:
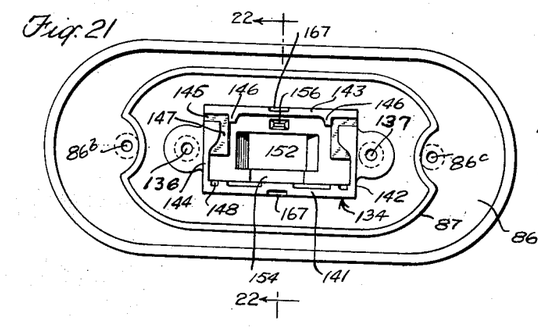
Figure 21 is a bottom plan view thereof.
Figure 22:
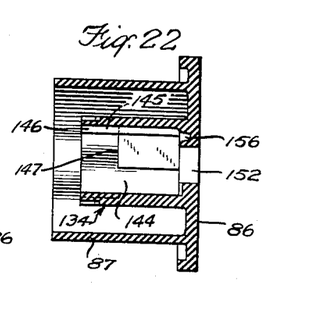
Figure 22 is a transverse sectional view, as seen along the line 22—22 of Figure 21.

For example, and referring to Figures 20, 21 and 22, within the casing part 87 of the fixture part 121, there is formed a housing of rectangular shape, comprising four walls 141, 142, 143, 144, shaped as shown in these figures. Walls 142 and 144 are similar in construction hence the details of one will suffice; thus, wall 144 has a slot 145 juxtaposed to which is a rib 146 which stands up from a shoulder 147 that runs along the end wall 144. At its upper end, as viewed in Figure 21, there is formed a vertical recess 148.

Figure 23:
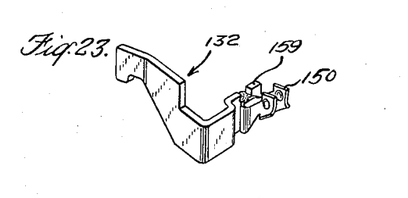
Figure 23 is a perspective view of a conductive member insertable into the structure of Figure 21.
Figure 24:
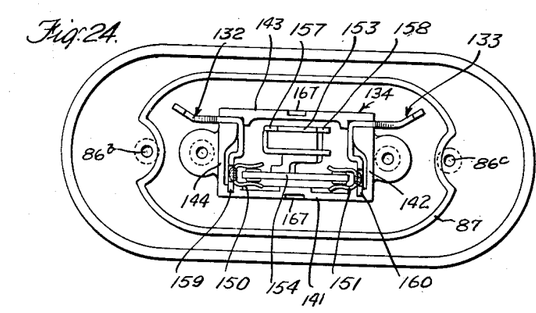
Figure 24 is a bottom plan view like that of Figure 21 but showing certain parts inserted therein.

These parts are shaped so that the conducting member 132 (Figure 17) may be readily inserted with respect to the wall 144 and conducting member 133 similarly inserted with respect to wall 142. Of these members one of them is shown in perspective in Figure 23 and in Figure 24 is shown how these conductive members are interfitted with the respective end walls. The two members, however, carry U-shaped contacts 150 and 151 (Figure 24) shaped as is better shown in Figure 23, the two contacts becoming juxtaposed to each other as shown in Figure 24.

In the bottom of the well or recess formed by the walls 141, 142, etc., is a hole 152 through which the finger piece 135 is to project; finger piece 135 forms part of a sub-assembly or unitary spring toggle type of switch of any suitable construction, and illustratively the latter may comprise a plate 153 (Figures 17 and 24) pivotally carrying the finger piece 135, an oscillatable member 154 (Figure 24), and suitable mechanism for causing the latter to snap one way or the other depending upon the direction of operation of the finger piece 135, and to cause it to electrically bridge or disconnect the contacts 150 and 151.

The frame plate 153 has a tab 155 which when the unit is inserted takes into a recess 156 (Figures 21 and 22) adjacent the hole 152, and it has two tabs 157 and 158 (Figures 17 and 24) which thus project beyond the plane of the walls 141, 142, etc. Likewise the conductive members 132, 133 have tabs 159 and 160 (Figures 24 and 23) which likewise project beyond this plane.

Figure 25:
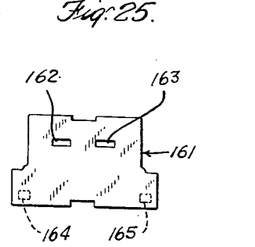
Figure 25 is a plan view of an insulating cover member.

The well is closed and the parts held in position, after being thus inserted by a sheet-like member 161 of insulating material like fiber and shaped as shown in Figure 25, having apertures or slots 162 and 163 into which the projections 157, 158, respectively, of the switch frame 153 are received and having also recesses or depressions 164, 165 in its under face and into which the projecting parts 159 and 160 of the conductive members 132, 133, respectively, are received. Over the fiber member 161 is then placed a sheet metal plate 166 (Figure 17) provided with two lateral extensions which are bent into and interlock with suitable recesses in the side walls 141, 143, as is indicated at 167 in Figure 17.

Thus, the parts inserted into the well or housing formed by the walls 141, 142, etc., are held in assembled relation and in particular it will be noted that the conductive members 132, 133 are securely interlocked with these walls and in a manner adequately to withstand the pressure exerted by them in causing the hook-shaped contacts 130, 133 (Figures 17, 18 and 19) securely to clamp the conductors thereunder.

Considering now how certain features of my invention may be carried out where the fixture is to be applied to the surface of a wall, or the like, rather than to be installed flush with the wall, as in the above described illustrative embodiments, and again assuming, for purposes of illustration but not by way of limitation, that the electrical part of the fixture is to take the form of a plug receptacle, reference may now be made to the device shown in Figures 26–30. In Figure 26 the fixture again comprises a two-part casing-like construction, one part being in the form of a plate-like contact block 170, illustratively circular (Figure 27), receivable within the side walls 171, illustratively cylindrical, of a casing counterpart generally indicated by the reference character 172 and having a plate-like top 173 that is circular or disk-like in shape (see also Figure 28).

The contact block 170 has extending along a diameter thereof an upstanding pillar or barrier 174, preferably molded or formed integrally with the base or contact plate 170. On the two sides of the barrier 174 are carried hook-shaped contact clips 175, 176 like the contact clips 71 and 72 earlier above described and like them having depending ears E (Figure 26) molded into or otherwise secured to the block or plate 170.

The contact block 170 is molded or shaped to provide tapering channels 177, 178 (Figure 27) at its diametrically opposite edges along the line of the barrier 174 and thus the member 170 may be slipped under an existing run of conductor or cable C, the insulation removed and the conductors therein bared, to form a loop with the bared conductors C—1 and C—2 inserted into the U-shaped or hooked contact clips 175, 176, the conductors being otherwise dependably separated and insulated from each other by the barrier 174. The member 170 may be secured to the wall or like surface by means of screws, countersunk holes 179 and 180 (Figure 27) being provided for that purpose. Thus, the member 170 becomes anchored to the wall surface and hence barrier 174, extending through the loop of the conductor construction as described and shown in Figure 27 dependably anchors the conductor C against being pulled in either direction.

To permit of bringing other conductor construction or cable to the contact clips 175, 176 from other directions, or to permit the run of conductor to partake of an angle, the contact block 170 is provided with other tapered channels, illustratively the channels 181 and 182, illustratively on a diameter at right angles to the diameter along which the channels 177 and 178 extend. Thus, also, the existing circuit as portrayed in Figure 27 may be tapped by putting bared conductor ends of a cable construction into the contact clips 175, 176 and run off in any of the directions made possible by the available channels in the member 170.

At suitable points, preferably diametrically opposed, the member 170 is provided with upstanding parts or shoulders 183, 184 into which are set and molded nuts or threaded bushings 185, 186 for a purpose later described.

Figure 28:
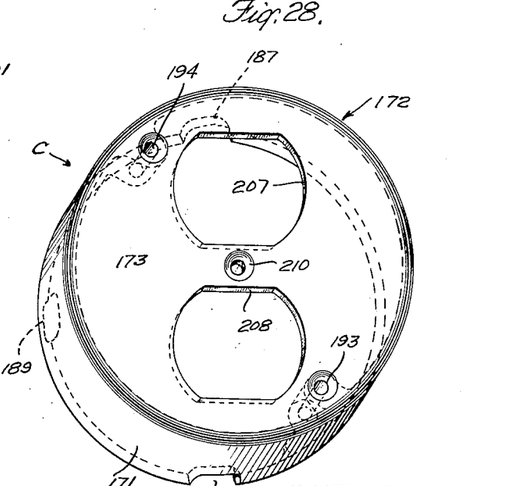
Figure 28 is a perspective view of a casing part of the structure of Figure 26, and Figures 29 and 30 are, respectively, a top plan view and a front elevation of a plug receptacle structure detached from the fixture construction of Figure 26.

With the member 170 thus installed as illustratively described, the counterpart member 172 of the fixture may now be placed over the part 170 so that the latter is received within the cylindrical wall 171 of the former. The part 172, also preferably made of a suitable moldable material, has its wall 171 provided, at its lower edge, with as many thin walled portions as there are exit channels in the member 170 and in Figure 28 two of these thinned out portions are shown broken out or away, as at 187, 188, in order to accommodate the two arms of the conductor or cable construction C that lie in the channels 177, 178, respectively; another thin-walled portion is indicated in Figure 28 at 189.

The fixture part 172 has related to it a suitable plug receptacle structure generally indicated at 190 in Figure 26, so that the sockets for receiving the prongs of a connector plug are exposed upwardly through the top wall 173; a preferred and possible construction is later described in detail.

Depending, however, from the plug receptacle 190 are two relatively rigid conductive members 191, 192 (Figure 26) preferably L-shaped as shown, these members being electrically connected to the contacts in the structure 190 which are to be engaged by the plug prongs.

The parts 191, 192 are so shaped and proportioned that when the fixture part 172 is telescoped over the contact block 170, the feet of these members engage the upper arms of the U-shaped contact clips 175, 176. The fixture part 172 is provided with countersunk holes 193, 194 (Figure 28) preferably diametrically opposed and spaced the same as are the threaded bushings 185, 186 in the part 170. Through these holes are placed screws 195 (Figure 26) and threaded into the bushings or nuts 185, 186, the screws tightly drawing the parts 170 and 172 together and thus causing the depending conductive members 191, 192 (Figure 26) to compress the contact clips 175, 176 and thus securely clamp the conductors C—1, C—2 and any other conductors in secure electrical and mechanical engagement with the clips.

Figure 29:
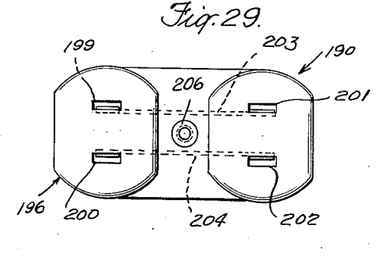
Figure 30:
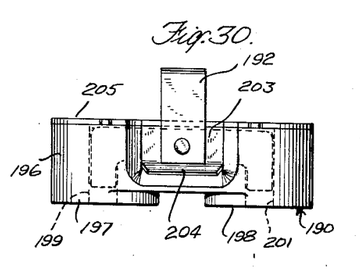

The plug receptacle structure 190 may, as above indicated, take any suitable form, and a preferred and convenient form is like that shown in Figures 29 and 30 where that structure is shown detached from the fixture part 172.

It comprises preferably a molded main body portion 196 having two upstanding parts 197, 198 provided with slots 199—200 and 201—202, respectively, for the reception of the paired prongs of two plugs. Where distinctions of polarity or the like are to be maintained, these sockets may be of different shapes, as shown in Figure 29.

Figure 26:
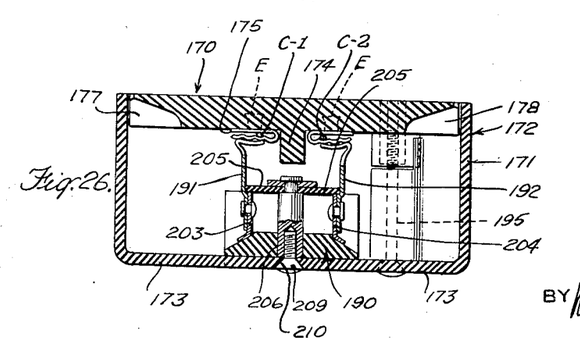
Figure 26 is a central vertical sectional view of a fixture construction, illustratively in the form of a plug receptacle, showing certain features of my invention as adapted for a surface fixture.
Figure 27:
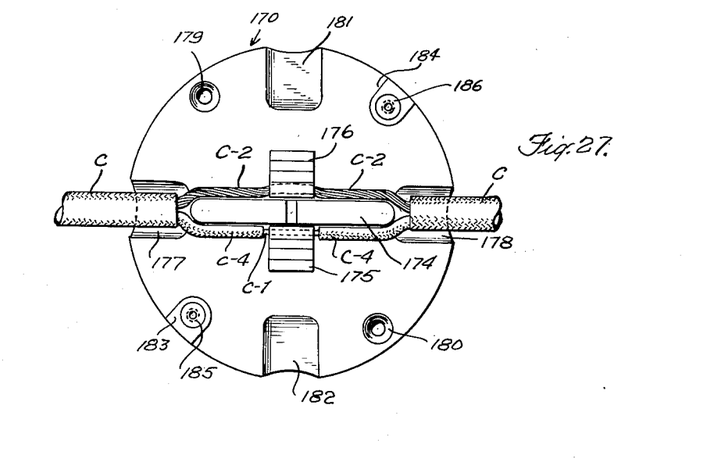
Figure 27 is a detached plan view of a connector plug employed in the construction of Figure 26.

The under side of the part 196 is suitably slotted, as indicated in dotted lines, so as to form channels connecting the lower ends of the socket or slots 199—201 and 200—202, and into these connecting channels are inserted the conducting strips 203 and 204, the latter being preferably exposed laterally at the central side parts of the member 196 (see Figures 30 and 26). They are held in place by a suitably shaped piece of fiber, or the like, shown in Figures 30 and 26 at 205, the latter being anchored in place in any suitable way. Centrally of the member 196 (Figures 29 and 26) there is secured or molded a threaded bushing 206.

So much of the structure 190 as is thus far described is of standard or well-known construction, a feature of this aspect of my invention making it possible to obtain the advantages of manufacture and the like of this known type of structure. However, I thereupon depart from such standard or known structure in that I have secured to the contact strips 203, 204, at the points where they are laterally to be exposed as above noted and prior to inserting them into the part 196 two L-shaped rigid conductive members 191, 192, as is clearly shown in Figures 26 and 30. They may be secured together in any suitable manner, as by riveting, spot welding, or the like, and are thus held assembled to the part 196 by the fiber member 205.

The top plate-like portion 173 (Figure 28) of the fixture part 172, the latter being also preferably of molded material, is provided with two apertures 207 and 208, respectively matching the shapes of the upstanding portions 197, 198 (Figures 29 and 30) of the part 196 and similarly spaced. Accordingly, the structure 199 of Figure 30 may be assembled against the under face of the cover plate part 173 with the portions 197, 198 thereof received into or through the apertures 207 and 208, respectively, whereupon a screw 209 (Figure 26), inserted through a hole 210 (Figure 28), is threaded into the bushing 206 to clamp and hold the structure against the under face of the fixture part 172, as shown in Figure 26.

It is to be noted, however, that this holding action of screw 209 is, when the installation is completed, as above described, materially supplemented by the action of the screws 195 which draw the two fixture parts together for by the action of these screws 195 the structure 199 as a whole, that is, the main body part 196 with its depending conductive members 191—192, is in effect clamped between the upper plate-like portion 173 of the casing part 172 and the under portions of the U-shaped clips 175, 176, with the conductors in the latter. Thus, a strong and durable assemblage well adapted to meet the conditions of hard practical use is brought about.

It will thus be seen that there has been provided in this invention a construction for electrical fixtures in which the various objects above mentioned, together with many thoroughly practical advantages, are successfully achieved. The construction, illustrated by way of adaptation to a plug receptacle and a switch but in a similar way adaptable to any other form of electrical device, not only is of simple and inexpensive construction and capable of speedy, dependable and reliable installation, but also achieves many electrical advantages. Outstanding among the latter is electrical safety of installation and operation in that, assuming that the conductor C—2 in the illustrative cable construction above shown is the grounded side of the circuit, grounded appropriately and preferably at that point where the main circuit enters the building or premises, the construction of my invention makes it possible to avoid interrupting this conductor C—2 irrespective of how many or what kinds of fixtures or tap-offs are related to the circuit. By the elimination of mechanical interruptions in the conductor C—2, endangering of life and giving rise to danger of fire are effectively eliminated in that I am thus enabled to avoid high resistance junctions or failures of junctions in the grounded side of the circuit.

In so far as the broader features of my invention are concerned, it is to be understood that the specific form of cable or insulated conductor construction above described in detail is intended to be illustrative and that other forms of insulated conductor construction may be employed to achieve the advantages and results of these broad features of my invention. In this connection, it may be pointed out that my invention makes it possible to use, in house wiring, other forms of non-metallic sheathed cable and that the fixture construction assures a dependable anchorage, not only of the conductors themselves but also of the outer insulating sheath therefor, thus insuring permanence of safety of installation.

As many possible embodiments may be made of the above invention and as many changes might be made in the embodiment above set forth, it is to be understood that all matter hereinbefore set forth, or shown in the accompanying drawings, is to be interpreted as illustrative and not in a limiting sense.

I claim:

1. An electrical wall fixture adapted for relation to an aperture in the surfacing of a wall that has therein an insulated conductor construction and for anchoring, and making electrical connection to the conductors of, said insulated conductor construction, comprising, in combination, an apertured mounting plate having means for securing it to said wall over said aperture in the latter, a totally enclosed box portion dimensioned to pass through said plate aperture and having means overlapping said mounting plate whereby it may be secured to the latter, said box portion having a rear portion which is removable and which has recess means at its two ends for the reception, respectively, of the two sides of a loop of said conductor construction, said rear portion carrying two spaced contact means, each engaging a conductor of said conductor construction appropriately bared intermediate of the sides of said loop, whereby said rear portion, when removed from said box portion, may be mechanically assembled to said conductor construction by causing the conductors of the latter to be engaged by said two contact means, said rear portion being held in position by said conductors for the assembly thereto through the aperture in said mounting plate of said box portion, and said box portion having two conductive members therein and respectively juxtaposed to said contact means, and means operable from the front of said box portion for drawing and holding together said two portions and for thereby clamping said bared conductors between their respective contact means and conductive members, said loop becoming thereby totally enclosed within said box-like portion without having to sever the conductors thereof.

2. In electrical fixture construction, in combination, a two-part fixture structure one of which is a housing-like part and carries an electrical device and the other of which is receivable into said housing-like part, said other member having two spaced hook-like connector clips within which two conductors are respectively receivable, said housing-like part having two conductive members in electrical connection with said device and spaced so as to be juxtaposed to said connector clips, and means for securing and drawing said two parts together, said conductive members being dimensioned to engage and, upon said two parts being drawn together, to compress said clips and clamp the conductors therein.

3. A fixture construction as claimed in claim 2 in which said housing-like part is provided with flange-like means adjacent its front face for resting against a wall face or the like whereby the rest of said housing-like part and also said other part received therein project to the rear of said wall face for reception into a recess in the wall, a sheet metal mounting member having a portion adapted to form a lining for said wall recess, said mounting member having two pairs of ears in planes separated by said lining portion, whereby said mounting member is reversible and may be related to said wall and its recess in either of two positions, means coacting with one pair of ears for securing said mounting member to said wall and means coacting with the other pair of ears for securing said fixture structure to said mounting member.

4. In electrical fixture construction, in combination, a two-part fixture structure one of which carries an electrical device and the other of which has at least one hook-like conductor clip into which a circuit conductor may be inserted without having to sever the conductor, said first-mentioned part having a conductive member juxtaposed to said connector clip and in electrical connection with said device, and means for securing and drawing said two parts together and thereby to press said conductive member against said connector clip and to cause the latter to clamp the conductor therein.

5. An electrical fixture construction as claimed in claim 2 in which said two-part fixture structure is provided with aperture means to permit entry and exit of an insulated cable construction having therein at least two conductors and in which said electrical device is a switch, whereby one of said conductors, when bared, may be severed and its two ends related to said two connector clips, respectively, at least one of said fixture parts having barrier means for electrically and mechanically segregating the remaining conductor from said clips and the bared conductor ends related thereto.

6. In electrical fixture construction, in combination, a two-part fixture structure one of which is a housing-like part and has recess means, an electrical device insertable into said recess means and having exposed therefrom and into the interior of said housing-like part two spaced conductive members in electrical connection with said device, the other part of said fixture structure substantially closing said housing-like part and having on the interior face thereof two conductor-engaging devices respectively juxtaposed to said two conductive members, and means for drawing and securing said two parts together and for thereby causing said conductive members to effect a conductor-clamping pressure with respect to their respectively juxtaposed conductor-engaging devices.

7. In electrical fixture construction, in combination, a contact block of insulating material having means upstanding therefrom forming a barrier for mechanically and electrically separating two electrical conductors, a connector device adjacent said barrier means to which one of said conductors may be related, a companion fixture part made of insulating material and carrying an electrical device, said companion part having exposed toward said connector device a conductive member in electrical connection with said electrical device, and means for drawing and holding said companion part and said contact block together and to effect an electrical connection between said conductive member and said conductor-engaging means that is a function of the pressure with which said companion part and contact block are drawn and held together.

8. In electrical fixture construction, in combination, a mounting member having an opening therein to substantially mate with a hole in a wall portion in back of which extends a conductor construction and having means for securing it to said wall portion, said opening being of sufficient size to permit a loop of said conductor construction to be drawn therethrough and the conductors thereof bared, and a two-part electrical fixture structure, one of which parts is of a size to permit it to pass through said opening and carries conductor-engaging means, one for each of the bared conductors, on the front face thereof, and the other part carries an electrical device and has means operable from the front of said wall portion to secure and draw together said two parts and also has means whereby it may be secured to said mounting member, said other part having also conductive members, one for each of said conductor-engaging means, which are pressed into electrical contact with the latter in response to the action of said securing and drawing means whereby said electrical device is electrically related to the circuit of said conductor construction.

9. A construction as claimed in claim 8 in which said wall portion comprises plaster or the like and plaster supporting means and in which said mounting member has supporting means engageable either with the face of the plaster or with the plaster supporting means according as the mounting member is installed prior or subsequent to the plastering-up operation.

10. In electrical fixture construction, in combination, a two-part fixture structure one of which parts is a housing-like part having a front wall and carrying an electrical device accessible through or exposed at said front wall, said part being open at its rear and having exposed toward said rear opening therein a conductive member that is in electrical connection with said device, and the other of said two parts comprising a closure for said rearward opening of said housing-like part, said closure part carrying on its inner face a conductor-engaging member with which a conductor may be engaged and so positioned on said closure part that when the latter is in housing-closing position said two conductive members are juxtaposed and in engagement with each other, and means for securing said two parts together to hold them in assembled relation and to press and hold said two members in electrical engagement.

11. A construction as claimed in claim 10 in which said closure part is provided with means for securing it to a supporting surface or the like, said means being closed over by said housing-like part.

12. A construction as claimed in claim 10 in which said housing-like part is shaped to extend into a recess in a wall or the like and its front wall is provided with means for securing it to said supporting wall or the like.

13. In electrical fixture construction, in combination, a sheet metal mounting member having an opening therein to substantially mate with a hole in a wall portion in back of which extends a conductor construction and having means for securing it to said wall portion, said opening being of sufficient size to permit a loop of said conductor construction to be drawn therethrough and the conductor or conductors thereof bared, and a two-part electrical fixture structure made of a solid dielectric material, one of which parts is of a size to permit it to pass through said opening and carries on the front face thereof conductor-engaging means for engaging and holding said bared conductor or conductors, and the other part has a front plate-like portion of sufficient expanse to cover over said hole and adjacent wall portions and carries an electrical device that has in electrical connection therewith a conductive means, one for each of said conductor-engaging means and respectively juxtaposed to the latter, means for securing and drawing together said two parts and for thereby pressing said conductor-engaging means and juxtaposed conductive means into electrical contact for thereby electrically relating said electrical device to the circuit of said conductor construction, and means operating by way of said plate-like portion for securing said assembled two-part fixture structure to said mounting member.

14. An electrical fixture construction as claimed in claim 13 in which said sheet metal mounting member has a depth commensurate with the thickness of the plaster of said wall portion and in which the means for securing it to the latter comprises flange-like means, the means for securing said assembled two-part fixture to said mounting member comprising flange-like means on said mounting member and screw means passing through said plate-like portion and into said last-mentioned flange-like means, said two flange-like means of said mounting member being in planes spaced apart by substantially the aforesaid depth of said mounting member, whereby the latter may be selectively positioned in either of two positions, one in which said first-mentioned flange-like means rests against the face of the plaster and the other, with said mounting member reversed, in which said first-mentioned flange-like means rests against the lathing.

15. In electrical fixture construction, in combination, a fixture structure comprising two parts, one of which has a casing-like portion open at the rear with communicating aperture means on its front face, for receiving therein an electrical device, said electrical device comprising sheet metal brush means inserted into said casing-like portion from the rear with the brush means accessible through said aperture means, said brush means having a conductive member in electrical connection therewith and exposed toward the rear open end of said casing-like portion, said other fixture part being shaped to enter the open end of said casing-like portion and having exposed toward the interior of the latter and juxtaposed to said conductive member a bendable sheet metal member having an electrical conductor engaged thereby, and means for securing said two fixture parts together and to clamp said conductor member, said bendable sheet metal member and said conductor together.

16. In electrical fixture construction, in combination, a fixture structure comprising two parts, one of which has a casing-like portion open at the rear with communicating aperture means on its front face, for receiving therein an electrical device, said electrical device comprising a switch construction inserted into said casing-like portion and having an operating means exposed through said aperture means, said switch construction having exposed toward the open end of said casing-like portion a conductive member in electrical connection with the switching mechanism of said switch construction, said other fixture part being shaped to enter the open end of said casing-like portion and having exposed toward the interior of the latter and juxtaposed to said conductive member a bendable sheet metal member having an electrical conductor engaged thereby, and means for securing said two fixture parts together and to clamp said conductor member, said bendable sheet metal member and said conductor together.

17. In electrical fixture construction, in combination, a fixture structure comprising two parts, one of which has a casing-like portion open at the rear with communicating aperture means on its front face, for receiving therein an electrical device, said electrical device comprising a plug receptacle construction having a body of solid dielectric material with recess means therein containing sheet metal brush means, said plug receptacle being received in said casing-like portion with its brush means accessible through the aperture means in said casing-like portion, said brush means having a conductive member in electrical connection therewith and exposed toward the open end of said casing-like portion, said other fixture part being shaped to enter the open end of said casing-like portion and having exposed toward the interior of the latter and juxtaposed to said conductive member a bendable sheet metal member having an electrical conductor engaged thereby, and means for securing said two fixture parts together and to clamp said conductor member, said bendable sheet metal member and said conductor together.

18. An electrical wall fixture adapted for relation to an aperture in the surfacing of a wall that has therein an insulated conductor construction of at least two conductors and for making electrical connection to said conductors, said wall aperture being of sufficient size to permit a loop of said conductor construction to be drawn therethrough and said two conductors thereof bared, said wall fixture comprising two parts, one of which is of a size to permit it to pass through said wall aperture and carries two spaced conductor-engaging means, one for each of said bared conductors, on the front face thereof, whereby said fixture part may be mechanically assembled to said conductor construction by causing the two bared conductors of the latter to be engaged respectively by said spaced conductor-engaging means, the other part of said fixture comprising a box portion of a size to enter said wall aperture and open at its inner end, said box portion having therein an electrical device and exposing toward its inner open end two spaced conductive members that are in electrical connection with said electrical device, said first part and said box portion being peripherally interfitted to form a telescopic connection therebetween, whereby said box portion, after said first part has been mechanically assembled to said bared conductors, may be telescopically interfitted with said first part to bring said two spaced conductor-engaging means of the latter with the conductors engaged thereby respectively juxtaposed to said two spaced conductive members, means operable from the outer end of said box portion to secure said first part to said box portion in said interfitting and telescopic relation and to draw said first part inwardly of said open end of said box portion and cause said spaced conductive members to effect a conductor-clamping pressure with respect to their respectively juxtaposed conductor-engaging means and bared conductors, a portion of said loop becoming thereby totally enclosed within said assembled two fixture parts, there being aperture means where said two parts peripherally interfit for the entry and exit of the two sides of said loop portion, and means operable from the outer end of said box portion for securing said assembled two-part fixture to said wall with said box portion projecting into said wall aperture.

CHARLES W. ABBOTT.